(12) United States Patent
Dufournier

(10) Patent No.: US 7,391,306 B2
(45) Date of Patent: Jun. 24, 2008

(54) METHOD AND DEVICE FOR DETECTING TYRE WEAR OR THE LIKE

(75) Inventor: Arnaud Dufournier, Clermont-Ferrand (FR)

(73) Assignee: Dufournier Technologies SAS, Cournon d'Auvergne (FR)

( * ) Notice: Subject to any disclaimer, the term of this patent is extended or adjusted under 35 U.S.C. 154(b) by 362 days.

(21) Appl. No.: 10/432,195

(22) PCT Filed: Nov. 19, 2001

(86) PCT No.: PCT/FR01/03622

§ 371 (c)(1), (2), (4) Date: Mar. 25, 2004

(87) PCT Pub. No.: WO02/40296

PCT Pub. Date: May 23, 2002

(65) Prior Publication Data

US 2004/0154715 A1   Aug. 12, 2004

(30) Foreign Application Priority Data

Nov. 20, 2000   (FR) .................................. 00 15243

(51) Int. Cl.
*B60C 23/00* (2006.01)
(52) U.S. Cl. ...................... 340/442; 340/446; 152/154.2
(58) Field of Classification Search ................. 340/442, 340/425.5, 444, 447, 446; 152/154.2, 209.5; 116/208
See application file for complete search history.

(56) References Cited

U.S. PATENT DOCUMENTS

| 3,578,055 | A | | 5/1971 | French et al. |
| 3,694,803 | A | * | 9/1972 | Strenglein .................... 340/447 |
| 3,770,040 | A | * | 11/1973 | De Cicco .................. 152/152.1 |
| 3,929,179 | A | | 12/1975 | Hines |
| 6,220,199 | B1 | * | 4/2001 | Williams ..................... 116/208 |
| 6,591,671 | B2 | * | 7/2003 | Brown ........................ 73/146.5 |
| 6,748,797 | B2 | * | 6/2004 | Breed et al. ................... 73/146 |
| 6,883,567 | B2 | * | 4/2005 | Shimura ................... 152/154.2 |

* cited by examiner

Primary Examiner—Phung T. Nguyen
(74) Attorney, Agent, or Firm—Rothwell, Figg, Ernst & Manbeck, P.C.

(57) ABSTRACT

When the tire reaches a limit of wear level, tire wear indicators generate an acoustic signal by knocking the ground. Magnetic, optical and mechanical versions exist.

Figure 1:
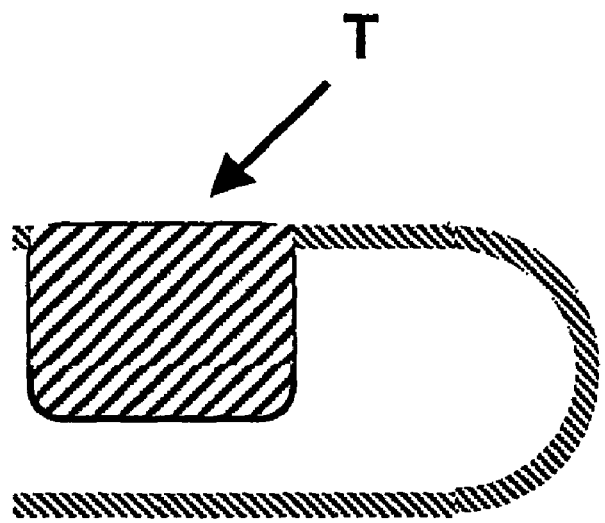
Figure 1:
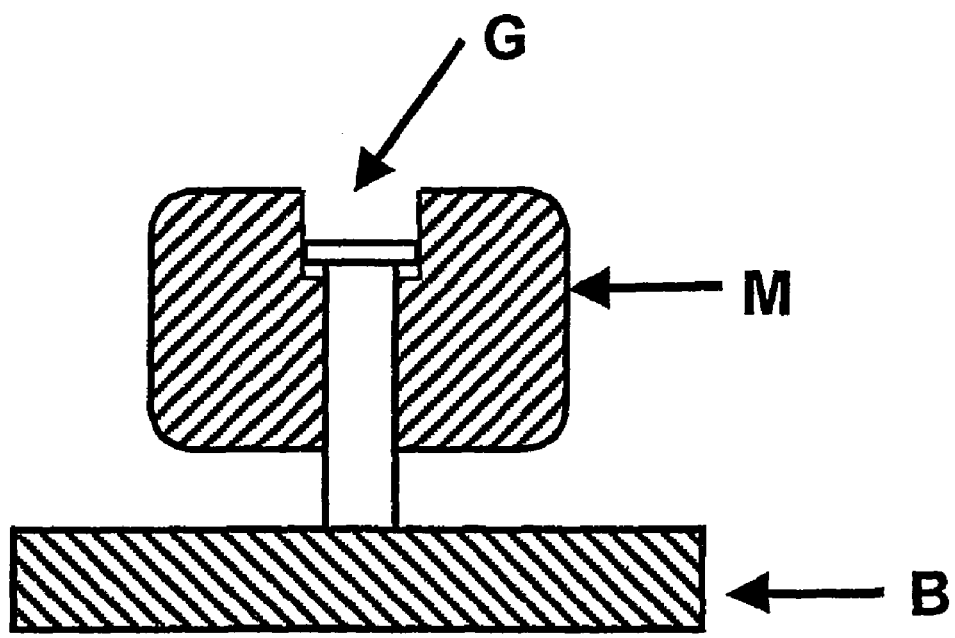

A detector made of a microphone located under the vehicle and a processing central unit switches on a warning included in the dashboard.

In a more sophisticated version, the detector recognizes the incriminated wheel using the phase of the acoustic signal and the information from the ABS™. Application to the detection of the decay of a tire, or any other type of wear surface such as pad, or similar, and to the detection of the presence of snow chains or spikes.

51 Claims, 6 Drawing Sheets

METHOD AND DEVICE FOR DETECTING TYRE WEAR OR THE LIKE

CROSS REFERENCE TO RELATED APPLICATION

This application is a 35 USC §371 National Phase Entry Application from PCT/FR01/03622, filed Nov. 19, 2001, and designating the U.S.

TECHNICAL DOMAIN OF THE INVENTION

The present invention concerns the technical domain of powered vehicles and more specially devices and methods to improve their control, and particularly the technical domain of the study of such devices and methods to control their tires and in particular their level of wear.

As the expert will understand easily, the technical sector of the invention extends, to any method and device allowing to detect and/or to control the wear of any surface or zone of wear, provoked by, generally, a friction on another surface or zone called contact area.

An absolutely non restrictive example is represented by slipping pads, pillows or friction shaft bearings, landings of lubrication shaft bearings or the other mechanical wearing elements, and similar.

We shall easily understand that the wear can be provoked by an other phenomenon, for example the chemical attack of the constituent material of the zone of wear. In such a case, for example, the magnetic option which will be described, can be used.

To simplify, we shall mean in all the present demand, including the drawings and the claims, by "tire" not only tires and more generally all the similar treads, but also all the zones or wear surfaces mentioned above, and by "wear" we shall mean as well the wear of tires or treads by rotation on a surface of movement, including on test machine called "rolling bench", as the wear for example by chemical attack and all the options and similar versions which will be directly accessible to the expert, and that are naturally impossible to recall entirely every time.

When it will be necessary and/or possible, the present demand, including the claims, will include words such as surface (or zone, and so on . . . ) of wear, but except particular mention any other more specific word will include all the options and versions and the adaptations described above.

PREVIOUS ART

We know certain marking devices integrated into tire treads, and which either disappear or appear when the wear of the tread becomes critical.

Such systems can be consulted only when stopping, and in a manual or visual way, wheel after wheel. Except for extremely conscientious drivers, they do not present preventive interest.

Besides, for the large fleets of vehicles, for example the vehicles of intervention of Energy suppliers (Electricité de France), the mail delivery services or similar, either the fleets of rent vehicles, or trucks, we do not know any system allowing to control quickly and reliably all the tires of the fleet, nor to play a preventive role, and thus to allow a follow-up of the fleet or an embedded auto-diagnosis embarked to inform the driver or car repairer and\or at distance for the service in charge of the vehicle maintenance.

There is thus a important and recognized need of a system which would allow to control easily, very quickly, possibly continuously, the level of wear of every tire of every vehicle of a fleet, or heavy goods vehicles, or to play a preventive role for the drivers.

Besides the fact that it would considerably reduce the risks of serious accidents, an automatic diagnosis would hardly reduce the immobilization time of the vehicles of a fleet and would allow to optimize and to plan the change of their tires, what would represent a considerable advantage, even crucial for heavy goods vehicles.

OBJECTIVE

The objective of the method and the device, according to the invention, consists in detecting one or several tires (or tread) having reached the limit of wear, and to inform the driver, the systems and the embedded safety systems (anti-skid system, anti-blocking of brake ABS™, path control system) so that they take the appropriate decisions.

By tire we mean in all the present demand, including the claims, and as will easily understand the expert, any kind of tire or tread of any type of vehicle or any type of material, equipment, mechanical part and so on . . . or more generally any part of an object in rotation and/or in translation or an other more complex movement, expected to wear out at the level of the aforementioned part, at the level of the contact with the surface <<of contact>> on which it is in rolling or have other movement, as already indicated previously.

We shall understand, in the reading of what is going to follow that the expert will have no difficulty, from the description and the examples which are rather focused on tires and treads, to adapt the invention for any other applications suggested above, or which could appear as a result of the evolution of technologies (for example, trains or the other vehicles on airfoil including a wearing surface, and so on.) and what is physically impossible to describe entirely.

This information can be also supplied to the onboard computer for the maintenance diagnosis or passed on to external devices (toll, fixed post station, maintenance station, fleet management central unit, and similar).

The system naturally has to remain the simplest and the most economic as possible.

A difficulty of this monitoring is that it is of slow type. That is to say the phenomenon to be measured evolves generally very slowly (except incident) what might have disappointed the searchers to progress in this way.

Another difficulty is that the background noise can be too high. This might have dissuaded the searchers. In this respect, we shall note that the detection range does not necessarily represent all the domain of use (e.g.: detection activated between 40 and 60 kph,—speed range in which we cross systematically at least twice when driving and which is thus enough for the detection—with locking outside this range according to the applications).

DOMAIN OF APPLICATION

Any vehicles, powered or not, equipped with "tires" in the broad sense defined above, treads, wear surface by any type of wear, and so on . . . This device can also apply to other domains that vehicles (e.g.: industrial machines) as also described above, and in any type of movement(s) leading to wear (rotation, translation, more complex movements . . . ).

By "vehicle" we shall thus mean in all the present demand, including drawings and claims, not only vehicles literally, but also all the objects, the machines, the mechanical parts, and so on . . . among which some were described above and other, impossible to describe all, but will be accessible to the expert, containing at least a surface or one zone of wear in the broad sense also described above.

To be completely understood, we indicate, as absolutely non restrictive example, that a word such as <<tire of a vehicle>> will automatically include, including the claims, the other realizations such as a slipping pad fitted on a building site dump truck or a pad or a part of helicopter rotor, or a lubrication shaft bearing of a vessel propeller, etc. . . In this last case, "driver" will automatically be understood by the expert, as the mechanic of engine room expected to look after any incident being able to appear at the level of the "shaft bearing" of the vessel, as for example wear exceeding a certain threshold. In the case of the helicopter, it would be obviously either the pilot, or the mechanic responsible for the maintenance.

The expert will have no difficulty to adapt the invention described below with reference to more precise examples.

SUMMARY OF THE INVENTION

Tire wear is an unavoidable phenomenon, but highly variable according to the use (kind of driving, route, settings of the vehicle).

During incident, incidental modification of suspension geometry, blocking of wheels during braking, warping of a brake disc, . . . the wear can be strongly accelerated.

On the other hand, the excessive wear of tires can have serious consequences on vehicle behavior: aquaplaning, damage to the structure of the tire leading to its decay, change of handling. Besides the limit of wear is subject to a standard and a legal obligation. It is liable to entail a fine if it is not respected or if it implicates the responsibility of the driver in case of accident.

To summarize, tire wear is an unavoidable phenomenon with an unpredictable evolution, but has important consequences in term of safety.

The method and the device proposed according to the invention allow to detect such premature decays of the tire, by incorporating into this one inserts generating a characteristic acoustic signal when the tire is worn out to the aforementioned inserts.

This method or this device is completed by an electronic apparatus, which detects the appearance of the characteristic acoustic signal of the limit of acceptable wear.

As a general rule we can use two principles of detection:
The inserts wear out and disappear totally when the level of wear is reached. Then we detect their missing by the absence of their characteristic signature.
The inserts are incorporated in depth so as to appear when the level of wear is reached. Then we detect their appearance by the appearance of their characteristic signature.

In all the present demand, including claims, the expert will understand that any description of a "method" makes accessible the description of the corresponding "device", without repeating pointlessly the description, this in a purpose of clarity and conciseness.

The description will be duplicated when it will be considered necessary or useful for a better understanding.

METHOD

NB. It is reminded (cf. above) that the description of the "process" will not be duplicated pointlessly, neither in the following description of the "method", nor in the claims of "device", excepted if it seems strictly necessary for an easy reading. So, the expert will understand that, for example, the description of a method containing a stage X will be considered as automatically describing, mutatis mutandis, a device (or equipment and so on . . . ) including "means to implement the stage X >>. When the description will be more accurate, for example that of a method including the implementation of sensors Y in a stage X, the description will be considered as automatically describing a device (or equipment and so on . . . ) including sensors Y in the context described for the method. This is also true for the claims.

If not using this simplified arrangement, which every expert will understand, the description and the claims would become unwritable.

The invention concerns, in a general way, a method to detect the advanced decays of a "tire" (in the broad sense defined above), that is to detect the moment when its state of wear (during and because of its rotation and/or the other movement in the contact of a surface said <<of contact>>, or because of another cause such as a chemical attack, corrosion, and so on . . . ) reaches a predetermined threshold. This threshold is characterized in the fact that it includes the incorporation or the settling in the tire of <<tire wear indicators>> adapted to generate, during their passage on and\or in the neighborhood of the aforementioned contact area, a characteristic and distinguishable signal when the aforementioned wear make them appear or remove them, in an appropriate proportion. The incorporation or a setting up is adapted so that the aforementioned signal appears or disappears when the predetermined wear threshold is reached.

We shall understand by <<appearance "or" disappearance>>, as well as "appear" or "disappear", that these two opposites terms include in all the present demand, including in the claims, without that it is useful to repeat it, all kind of appearance or progressive disappearance of the tire wear indicator and/or of the signal, the signal being considered for "appearing" or being considered for having "disappeared" when a certain threshold is reached.

The aforementioned "tire wear indicators" can be of some nature, since fine or unrefined, agglomerated particles or not, up to inserts of dimensions and varied shapes, and including sculptures or forms integrated in or on the tire, and all the possible versions which will be accessible to the expert, being appointed in all the present demand by "tire wear indicators".

By <<characteristic and distinguishable>> we shall mean in all the present demand, including the claims, that the tire wear indicators are adapted to produce an appropriate signal which is detectable in the detection range of the sensors arranged for that purpose, and distinguishable with regard to the background noise and to the other possible causes of acoustic signal, such as the rolling noise of a vehicle, its aerodynamic noise, possibly the acoustic signal generated by a stone clamped in the tread, and similar. In other words, this means that we shall define tire wear indicators, in the broad sense described above, isolated or in combinations, generating for example a signal of natural frequency clearly recognizable, impossible to confuse with the frequency of the body, the hub, the tire, the parasite frequencies, and so on.

DETAILED DESCRIPTION OF THE INVENTION

General Principle:

According to a favorite mode of realization, we shall use tire wear indicators of "acoustic" type generating an acoustic signal.

Such tire wear acoustic indicators can be, either inserts or other pieces, or geometrical forms or adapted tread pattern, either to generate a specific acoustic signal in the contact of the contact area, the signal disappears when the aforementioned shape or the specific tread pattern is worn out beyond a predetermined threshold, or to generate an acoustic signal by their contact with the contact area when it appears, beyond a predetermined wear threshold of the tire.

According to a non restrictive mode of realization, the acoustic tire wear indicators are inserted into the mass and/or into the rib, the groove and so on. of the "tread" of the tire (or of any " zone or wear surface>>) to an adapted depth so as to create a contact with the ground (or any "contact area") when the wear limit is reached.

Still according to a mode of realization, when the tire is worn out up to the tire wear indicators, these hammer the ground during the rolling and thus generate an acoustic signal.

This acoustic signal depends on the number of tire wear indicators hammering the ground, but also of their location, the speed of the vehicle and on the acoustic characteristics of the tire wear indicators inserted into the tire.

This signal consists of a basic frequency (selected by the expert to be specific and distinguishable, as explained above) corresponding to its natural acoustic frequency fa of the tire wear indicator inserted into the tire and appears every time a tire wear indicator hits the ground.

The expert will understand that, the "natural frequency" of the tire wear indicator to take into account, is the frequency of the tire wear indicator when it is incorporated in the tire.

Moreover, the signal fa is modulated by a function ft which depends on the number of tire wear indicators, their arrangement or "setting up", but also of the wheel rotation speed.

This function ft is a harmonic function of the wheel round.

This frequency will be also predetermined to be specific and distinguishable and/or to bring additional information.

As clarified below, we can notably, combine several series of tire wear indicators transversely located with regard to the "tread", with at least a tire wear indicator by azimuth of wheel, every series corresponding to wheel azimuths at least partially different.

So we shall get a characteristic functions ft1, ft2, ft3 for various series of tire wear indicators, the series 1 corresponding to azimuths a, b, c, d, the series 2 to azimuths a (or different from a), e, f, g, h, i, etc.

We remind that the wheel azimuth is an angle which identify the angular position alpha of a fixed point of a wheel with regard to a given angular reference. The reference 0° can be for example in coincidence with a wheel reference such as the valve, or tire such as the DOT which is a well known mark molded on the tire. The other azimuths are determined by rotation around the axis of the wheel starting from this initial mark.

Knowing the distribution of the tire wear indicators in the tire, and the wheel rotation speed (that is measured either by speed wheel sensors which can be already present on the vehicle as for the ABS™, or from the measurement of the speed of the vehicle), the harmonic function ft can be easily built.

The function fa is also known the design and the incorporation of the tire wear indicators in the tire.

Amplitude Modulation fa: modulated signal ft: modulating signal

We can see in what precedes an analogy with an amplitude modulation where fa would be in a sense the modulated signal and ft the modulating signal.

According to a non restrictive mode of realization, the method is characterized in what, in the case of a multi-level detection, we can use either tire wear indicators having distinct acoustic signatures fa for the various levels and/or we can use a particular setting up of the tire wear indicators corresponding to each level of detection (adjustment of ft for each wear level).

Data Processing

According to a non restrictive mode of realization, the method includes a data processing with the aim of the global extraction A) of the useful signal S(t) and which enlists the following stages:

B) Extraction of the tire wear indicator signal and/or

C) Extraction of the signal of setting up, and eventually stages of additional improvements such as The identification of the incriminated wheel, and/or The optimization of the volume and the time of calculation, and/or A data processing for the discrimination with regard to the other vehicles Evaluation of the Information "Immediate Wear Level"

We shall find below the detailed description of non restrictive types of such data processing. Every expert of the domain of the signal analysis will be able to understand what follows and to deduct from it some versions, adaptations, improvements, and so on . . . accessible, which are also a part of the invention.

1 Extraction of the Useful Signal S(t):

To extract the useful signal, we make the following data processing on the basic signal:

The extraction A) of the useful signal includes two different phases B) and/or C). These two successive stages can be implemented in a sense or in the other one notably to reduce as soon as possible the volume of data to process.

We can also make only one of both phases B) and/or C) to reduce the number of operation to make and thus to simplify the data processing. However in the general mode, we shall make both stages to obtain the most successful extraction.

Extraction of the Tire Wear Indicator Signal

We shall make a digital or analog filtering aiming at keeping only the signals corresponding to the natural frequencies of the inserted tire wear indicator. In acoustic mode, we shall talk about the natural acoustic frequency of the tire wear indicator inserted into the tire.

In case where we have of several tire wear indicators each of them corresponding to a level of wear detection, we shall make for every type of tire wear indicator this last operation centered every time on the natural frequency(ies) of the signal of the tire wear indicator considered inserted into the tire. We shall then call the extracted signal Si(t)

We can here make an analogy with a demodulation of the basic signal by the signal notably made of harmonics of the round of wheel corresponding to the setting up of the inserts.

This first stage allows to reduce considerably the volume of data to process afterward.

Extraction of the Signal of Setting Up

The setting up distribution of the tire wear indicators in the tire creates, because of the rotation of the wheel, a "modulating" signal being a harmonic function of the wheel round.

Thus, we use this property to extract from the basic signal the signals appearing to harmonic frequencies of the wheel round corresponding to the setting up of the tire wear indicators that we try to detect. We shall call Fi(t) the modulating signal corresponding to a wheel and to a level of wear, that is to a setting up.

Here an analogy may be made with a demodulation of the base signal by the signal comprised in particular of wheel revolution harmonics corresponding to the implantation of the sensors.

In a particularly interesting mode, this "demodulation" can be made from a correlation between the basic signal and the "modulating" signal. This modulating signal corresponds successively to each of the signals Fi(t) of a wheel (or in a simplified version in a part or all the wheels) and to a level of wear to be monitored and corresponding to a setting up. These modulating signals Fi(t) can be taken from the signals supplied by the wheel speed sensors of the ABS which will then be modified according to the various setting up each of them corresponding to a level of wear.

In the case where the ABS information or the individual wheel speed information are not available, the speed information already available on all vehicles can be used to determine the "setting up information" before correlating it with the basic signal.

In case we dispose of several setting ups, each of them corresponding to a wear detection level, we shall make for every setting up this last operation adjusted on the "modulating" signal corresponding to every setting up. The result will be called Si(t)

For these two stages, we can talk about a sort of amplitude demodulation of by the frequency of the wheel rotation or to a multiple frequency of the wheel round, and the frequency of the modulated signal corresponds to the natural frequency of the tread wear indicator inserted into the tire.

As the expert will understand, all these options and versions can be combined in different ways, according to the applications.

Additional Improvements (Possible and Possibly in Different Combinations)

Identification of the Incriminated Wheel:

In bend or because of a different torques on axles and even on wheels, we can consider that every wheel has its own speed. So, during an sufficient delay the identification of the incriminated wheel is possible by a follow-up of the phase of the signal and a comparison with regard to each of the wheel speeds.

Thus, we can successively compare the phase of the basic signal with representative signals of each of the wheel speeds (we shall take in an example highly preferred for these last signals the wheel speed signals supplied by the ABS™ sensors).

We can then deduce from it which wheels(s) has reached the level of wear.

In an interesting realization mode, we can use for example the usual techniques of loops with digital or analog phase locking.

Optimization of the Volume and the Time of Calculation:

We can considerably reduce the volume of calculation to make in the phase said of setting up extraction notably by using the Hadamard transform to calculate the correlation between the basic signal and the setting up signal. This approach eliminates the storage of the data and the too complex and quite long such as operations of multiplication or addition which require long calculation time, notably for the microcontrollers and generally for all the computers.

Still in a favorite mode made to simplify and to relieve the setting up extraction, the Hadamard transform will be applied to the basic signal in phase quadrature (data processing only applied to the modulus and elimination of the phase).

Still according to a possibility, once the detection is confirmed, we can use a phase analysis mode (CPU time saving), because we know that at least one of the wheels is worn out. Then we try to determine which of the wheels is worn out using intercorrelation between the acoustic signal and the examined wheel (harmonics of the wheel round). This mode which can come to an end for example after the switch off the ignition of the vehicle with thus a come back to detection mode until reconfirmation of the detection and then switching to in the of mode phase analysis and so on. . . .

Distinction of Extraction Zones:

We shall also notice here that the extraction can only be made in domains favorable to the measurement providing that we are enough frequently in these domains.

Indeed, the wear of a tire is a phenomenon which evolves slowly and it is thus convenient to operate only in favorable monitoring conditions, but only if condition that the aforementioned conditions are chosen so that the "vehicle" has the opportunity "to cross" them within sufficiently short time intervals not to let, between two favorable zones of detection, a dangerous evolution of the wear of the tire;

According to a mode of realization highly preferred, we shall thus make the monitoring of wear in favorable zones, that is in zones where the sensors and the electronics will not be disturbed by phenomena generating interferences, disturbing or even saturating the system, such as speed exceeding certain threshold (beyond, aerodynamic noises become too important), rain (in case of rain, very important interferences by the projections of water on the body, the sensors, and so on . . . ), presence of bits of gravel (the same consequence), and the other situations which will appear easily to the expert.

In a "favorable" domain the parameters that are predetermined and memorized (and eventually adjustable by the manufacturer or the car dealer according to the countries of use of the vehicle), the method and the device according to the invention is active and detect the wear.

In a "non favorable" domain the parameters of which are predetermined and memorized (and eventually adjustable by the manufacturer or the car dealer according to the countries of use of the vehicle), the method and the device according to the invention "stand by" that is they do not take the data into account.

As soon as the conditions allow to work in favorable conditions, the method and the device according to the invention turn to an active mode and consider again the data as useful and the detector may again change its state of detection.

We can select for example a favorable speed range, and/or a long duration of a few seconds to some minutes.

For example: range of speed 20-60 kph and detection at the end of one minute. So, at each starting up, or zone of slowing down (toll, service station, driven in city and so on . . . ) the detection will be activated; on the other hand, on highway (between slowings down or stops) the system will set in a stand-by mode (speed, for example at 130 kph aerodynamic noises are too important). Even on a very long route on highway, it is evident that the driver will be obliged to stop or to slow down within time intervals sufficiently short so that the detection after a "unfavorable" range occurs well before an important degradation of the tire.

According to one embodiment, the system electronics can be preprogrammed so that when entering an "unfavorable" zone, it records and stores to memory (after, for example, a time lag of one minute) the average characteristics of the "spurious noise" (average intensity, average frequencies, etc.) in order to be able to detect repeated AND rapid anomalies appearing in relation to this "reference spurious noise" and warn the driver and optionally also the other onboard systems.

Thus, if in a rain zone and/or at 110 km/hour, a nail gets stuck in the tire, the system will be able to detect a repeated AND rapid change (upon each turn of the wheel) in the spurious noise. The system will be parameterized so that in the case of a rapid ("rapid"=delta time to be predefined), significant (threshold to be predefined), and repeated variation in one of the parameters of the spurious noise, over a minimum period of optionally 20 seconds or one minute, the system triggers a driver alarm "STOP" or the like.

On the other hand, if under the same conditions the tire rolls over a nail and all the nail does is bounce off the car's body or the chassis or the wheel arch, the system will record ONE sound anomaly, a blow on the car body, optionally two or three if the nail bounces off once or twice, but certainly nothing lasting more than several seconds: since the minimum period and/or the repetitive nature are not recognized, the system will not trigger an alarm.

The domain in which scan is able can also correspond for example to a period beginning at the starting up of the vehicle.

We can also, in this mind, accelerate the detection delay if the detection was already positive in the previous route.

Differentiation from other Vehicles:

Because vehicles generally do not travel at the same speed and in particular over a long period of time, the measurement can be performed over a period of time which is long enough (several seconds to several minutes) to avoid confusion with an identical vehicle which is traveling alongside it.

This approach can, of course, be reinforced by phase analysis such as the one mentioned previously in detection of the wheel at fault in order to differentiate signals coming from its own wheels versus those coming from other vehicles . . . .

Comparison—Spatial Adjustment

According to an interesting mode of realization, the method, according to the invention, includes a stage of <<comparison—spatial adjustment>> between a front wheel and a rear wheel for example during the calculation of the factor C (factor of comparison of the wheel under test to a reference wheel (or signal normalization)).

The purpose of this optional but extremely important stage is to make a comparison on both wheels said "at identical ground" that is the coefficient C incorporating the spatial adjustment (cf. below) allows to free itself exactly from disparities of the ground, such as bump, groove, and so on. . . .

The use of this comparison is based on the observation that the front and rear axles do not wear out at the same speed and do generally not reach the level of wear at the same time.

This comparison can allow in particular to increase the quality of detection of the first of both compared wheels which reaches the critical level of wear.

This point of the method is a characteristic of application which can be important, to reach the best efficiency. This stage is not absolutely necessary, but could be in numerous cases a condition for the functioning of the device, notably on damaged ground.

It is also important (as a supplement to the spatial adjustment) to note that, according to a favorite mode of realization, we take into account wheels situated rather on the same side of the vehicle.

For example:

In the case of a front wheel under test compared with a rear wheel, the function will be:

$$C(t) = Si(t) - Sj(t + \Delta t)$$

Si corresponds to the front wheel

Sj corresponds to the rear wheel e distance between the two considered wheels.

$$\Delta t = e/V$$

With V=speed of the vehicle

V is calculated for example from the average speed of the not-driving wheels or the average speed of all the wheels.

In the case of a comparison to a set of wheels, we shall adjust spatially each of the front wheels to calculate the average criterion Sj of the wheels of comparison.

The calculation of the function Di will be then the following one:

$$Di(t) = \int_{x=t-T1}^{x=t} C(x)\,dx$$

Such versions can also help to refine the management of the tire wear of a vehicle fleet of vehicles, for example heavy goods vehicles.

2 Evaluation of the Information of Immediate Wear Level

The method according to the invention is characterized in the fact that it includes a stage of evaluation of an immediate wear information.

For each of the wheels, we calculate the values D1(t), D2(t), D3(t) and D4(t). This enlistment being made for a vehicle of tourism with four wheels.

These values are used to make a follow-up of the evolution of the wear of each of the wheels.

$$Di(t) = \int_{x=t-T1}^{x=t} Si(x) \cdot dx$$

Range of order:

T1: some fractions of a second to some tens of minutes

Remarks:

In the realization and to simplify calculations, we shall use instead of the integral slippery sums applied to the successive values of the useful signal Si(t) and on numbers of terms corresponding appreciably to the duration T1.

The time period T1 can be replaced by a spatial length of progress of vehicle d1, which can, for example, be evaluated by the number of "tops" of the signals emitted from ABS™ encoders.

In the case of a multi-level detection, we shall calculate a function Di(t) for every Si(t).

Si(t) being the signal corresponding to a level of wear and to a wheel. We shall thus make a number of consecutive calculation of Di(t) corresponding to scanned wheels multiplied by the number of levels of detection.

In order to reduce the calculations, we shall first use only one calculation of Di(t) by level of wear. This value will be then significant of the reach of the level of wear i by at least one of the wheels.

These options are possible and useful in different combinations.

3 Extraction of the Final Information

The method according to the invention is characterized in the fact that it includes a stage of extraction of the final information according to which each values of Di(t) are compared with their respective thresholds Sli.

Remark:

In a purpose of simplification we can use values of Sli identical for either wheels of the same axle or for all the wheels of the vehicle or for the same level of detection.

These tests are followed by counters which increment and decrement according to the results of the tests.

When a counter Cpti overpasses a predetermined threshold, then we know that the corresponding wheel (or the corresponding wheels) has reached the corresponding threshold of wear.

These options are possible and may be use in different combinations.

Non Restrictive Examples of Devices Allowing to Improve the Sharpness of Detection.

The method, according to the invention, is as well characterized in the fact as it can include stages made to improve the sharpness of detection, such as the following ones:

The steering wheel angle can be used to invalidate the measurements beyond a limit steering angle. The results of measurement are then considered as non-existent during all the duration of the overtaking of the limit angle, counters Cpti then remain unchanged; and/or The measurement of the steering wheel angle can be taken from the already available information for some devices such as the path control system; and/or The knowledge of the outside hygrometry level allows to improve the extraction of the final information by balancing the thresholds Sli; and/or This knowledge can be supplied for example by means of rainy sensors being used for example to activate the windscreen wipers; and/or The knowledge of the internal pressure of tire helps to improve the extraction of the final information by balancing the thresholds Sli; and/or This measurement can be obtained for example by means of pressure sensors settled in wheels; and/or Threshold Sli can be also weighted by the average speed of the vehicle; and/or By the distance covered during the duration T1 and\or the time elapsed to cover the distance d1. These options are possible and useful in different combinations.

Learning ability:

The Sli thresholds can also be adjusted by learning. So a learning period will then be used during which it will be estimated that the tires are not worn.

The learning process can be initiated by an external order (onboard computer, tire monitoring system, pressure monitoring system, onboard or remote diagnostic and maintenance) or by human intervention (operator or driver); and/or The learning period can correspond to a specific period: for example, the thresholds can be fixed in relation to values of Di(t) during a period after the first time the vehicle is put into service; and/or The learning ability can, in another more sophisticated embodiment, make it possible to determine, in particular, a function Sli =f(V) with V: speed of the vehicle; and/or In another embodiment, the learning can be an ongoing process. The Process chosen will consist—on the basis of a prior condition—in learning the level of signal Di(t) when a level of wear has been attained and to reset threshold Sli as a consequence; and/or The learning ability can make it possible to avoid problems caused by the different effects of different types of tires, even if they are of different types or brands (for example snow tires mounted on a single axle), or their condition.

These extra features are optional and can be used in various combinations.

DEVICE

NB it is reminded that what was said for the "method" is also true, mutatis mutandis, for the "device", as indicated higher, and including in the claims.

The invention also concerns a device to monitor the premature decays of a tire (in the wide sense defined above). That is to say to detect the moment when its wear level (during and because of its rotation and/or the other movement in the contact of a said surface <<of contact>>, or because of the another cause as chemical attack, corrosion, and so on . . . ) reaches a predetermined threshold, characterized in the fact that it includes "tire wear indicators" incorporated or set up in the tire and adapted to generate, during their passage on and/or close to the aforementioned contact area, a characteristic acoustic and distinguishable signal when the aforementioned wear make them appear or remove them, in an adapted proportion, the aforementioned incorporation or setting up being even adapted so that the aforementioned signal appears or disappears when the predetermined wear threshold is reached.

Various modes of realization

Main Mode "Acoustics"

In this mode, the emission of the wear signal is made by "acoustic" tire wear indicators, as describes previously, the function of which is to generate a sound during their contact with the ground, after their appearance or before their disappearance.

The transmission is made through the air (and probably through solid elements)

The detection is made by means of one or several microphones (or possibly accelerometers, whose sensibility range is adjusted to the generation frequency of the tire wear indicators, or the other current or future sensors capable of realizing the same function).

Secondary Modes
   mechanical Mode
   electromagnetic Mode
      With version of metal detector
   optical Mode
   Description of the Mechanical Mode The signal is produced here by vibrations generated by mechanical tire wear indicators in material (identical to those quoted previously) harder than the tread of the tire and inserted into this one. These tire wear indicators appear at the surface of the tire when the degree of wear, corresponding to the level of warning, is reached. Then, they create a localized variation of tire radius, thus variations of angular speed of the tire, the wheel and the hub and vibrations of the tire, the wheel, the hub and the suspension system.

Then, the detection is preferentially made with the help of wheel-speed sensors (for example those of the ABS) or of accelerometers or force or movement measurements fitted on the wheel, the hub, the suspension system or the body.

Description of the Electromagnetic Mode

The signal is linked to the presence, the appearance, the decrease or the absence of generation of a magnetic or electric field.

Tire wear indicators, made up with ferromagnetic materials or charged with ferromagnetic particles (notably charged elastomers, are inserted into the tread and wear out with the rest of the tread, their signal weakening gradually up to a threshold which activates the alarm, either are implanted in the tread and gradually appearing, their signal becoming perceptible up to a threshold which activates the alarm. An interesting version consists in directly charging the tread (on, or at, a certain depth corresponding to the desired detection threshold, by disappearance or, respectively, appearance of ferromagnetic particles) during the extrusion or during a stage of manufacturing between the extrusion and the cooking. The charging after manufacturing is also possible.

Magnetic and\or electric field sensors are fitted on the suspension system (rather on the strut or equivalent) or on the body (rather in the wings).

We can also move the sensors closer to the tread, for a better detection, by positioning one or several sensors on an arm such as described below and in connection with the annexed drawing. This arm can be positioned for example in the wing around the wheel, above the tread, and including according to the main rule of the invention, at least one, rather three sensors, two of them positioned near each of the sidewalls, in order to detect prematurely decays due for example to an inappropriate toe, and the third one being appreciably positioned towards the middle of the tread.

This arm can be of some shape and some dimensions. It can be a bar incorporating one or several sensors and located transversely with reference to the wheel, either a flat or concave surface following the shape of wheel, possibly rather wide so as to accept either sensors placed in staggered rows or any other asymmetric arrangement (what allows for example to change the azimuth) or various types of sensors corresponding either to the three described modes, or to a single mode but with different dimensions or the other different characteristics, so as to generate different natural frequencies fa.

The data processing used is then identical to the one detailed previously, but with an inverted final information processing (the activation of the alarm being made when the counter is lower than a defined value.

The version, according to which the alarm signal is generated in case of decline or of disappearance of the signal, gives the mattering advantage concerning the safety to warn the driver if the tires are not equipped with the tire wear indicators, but also in case of failing of the generation or with the sensors or with the system of data processing (in this last case, it gives a false warning, but which is preferable to a non-detection of wear).

Version of Magnetic-electric Mode (Metal Detector)

In an interesting version of the magnetic-electric mode, the tire wear indicator is made of metal particles (or equivalent) inserted into the tread and the detection is made by means of metal detector sensors. These metallic particles or metal inserts are then inserted to a determined depth of wear, to have totally disappeared when the level of wear is reached.

By this method, we can also detect metallic tire wear indicators' presence such as described previously.

On the opposite, always according to the general principle of the invention, we can detect the appearance of the signal of inserts or particles implanted in depth, and not the disappearance of the signal of inserts or particles implanted or "charged" in surface.

The principle of detection is that the "receiver" generates or produces an electromagnetic field which is modified by the appearance or the disappearance of metallic particles or metallic inserts (which are thus passive), this modification being detected by a sensor integrated into the "receiver".

This is an example of complex receiver.

Description of the Optical Mode

The signal is constituted by the presence, the appearance, the decrease or the absence of a light signal contrasting with the rest of tread.

Tire wear indicators, made up with clear color materials (or sharply contrasting with the rest of the tread) such as for example colored elastomers or white or reflecting the light such as for example metallic elements, are either inserted into the tread and wear out with the rest of the tread, up to a threshold which activates the alarm, or implanted in the tread and gradually appear. Their signal becomes perceptible up to a threshold which activates the alarm. We can even in an interesting version directly charge the tread with reflecting or colored material during the extrusion or in a phase of manufacturing between the extrusion and the cooking. The charging after manufacturing is also possible.

Light sensors (for example diodes) with possibly a localized lighting (who can be made for example by luminescent diodes) are fitted on the suspension system (rather on the strut or equivalent) or on the body (rather in the wings) or in a highly preferred mode on an arm as described in example which allows to locate the sensors near the tread and facing it.

The data processing used is then identical to that detailed previously.

It is to note that the regular abrasion, created by the surface in contact with the tire, permanently cleans the tire wear indicators. The effects of dirt or pollution can thus be only temporary.

Favorite Mode of Realization, "Acoustics":

According to a favorite mode of realization, we shall use tire wear indicators of "acoustic" type generating an acoustic signal >>.

Note that such acoustic tire wear indicators can be, either inserts or other pieces, or geometrical forms or tread pattern, adapted to generate, either a specific acoustic signal when knocking the contact area, this signal disappears when the aforementioned shape or the sculpture is worn out beyond a predetermined threshold, or to generate an acoustic signal when knocking the contact area when, beyond a threshold of wear predetermined by the tire, it is sufficiently exposed. We can also use different combinations of such tire wear indicators.

The system or the device includes:

An acoustic generator inserted into the rubber and/or into the groove or "rib" of the tire and which generates acoustic signal when the tire is worn out.

When the tire reaches a wear limit level, acoustic tire wear indicators generate an acoustic signal by knocking the ground.

A "receiver" whose main function consists in detecting the presence of the characteristic acoustic signal when the limit of wear of the tire is reached and whose secondary function consists in identifying one or several wheels generating this signal.

By "receiver" we mean in all the present demand, including the claims, a receiver in the wide sense, that includes at least a sensor, and possibly at least a support, as for example an arm or similar, and possibly at least a case or an electronic unit or a central calculator, and similar devices, as for example a generator of electromagnetic field coupled with a sensor of this field, in the option mentioned above of the "metal detector".

Description of the Generator:

The elements of the signal generator are inserted into the tire either during the manufacturing, or later, as indicated earlier.

The acoustic generator is characterized in the fact that it includes:

Active part (function sound emission during the contact with the ground or the "contact area"):

These elements will be made up of hard material and will be (cf. FIG. 1):

Simple: small ceramic element for example, and/or
Mechanical: functioning for example by hammering of a mobile element of hammer type M (in the contact of the contact area) on a base B anchored in the tire;
Rather
Made in one single piece: made with a full and noisy material of ceramic or hollow and metal type (low cost, efficient)

We can use one or some of the following materials:
Metals and alloys (steel, and so on . . . )
Minerals (glasses, ceramic, and so on . . . )
Composites, fiber glasses, ceramic composites
Polymers or elastomers (e.g. elastomers high module e.g. superior to 20 MPa, resin formaldehydes, bakelite)
Plastics or thermoplastics
And similar.

It also includes an anchoring part:
Anchoring Part in the Tread:

Anchoring Base:

If it is made since the manufacturing, the anchor will be like claws (or similar forms B anti-wrenching) flooded in rubber blocks P and/or located in grooves. It will rather be longer than wide (better resistance to the longitudinal forces).

The tire wear indicators can be coated with an intermediate material, in term of hardness, between the tire wear indicator and the material of the tire. This material will possess rather three functions or at least some of them:

→to Create a progressive pressure gradient of hardness between the material of the tire and the tire wear indicator to distribute more favorably the mechanical shear constraints.

→to Serve as intermediate adherent material between the tire wear indicator and the material of the tire.

→to Protect the tire wear indicator of the outside attacks (mechanical or chemical) before this coating is removed by wear.

The anchoring system will notably be made:
By means of claws or similar forms inserted into rubber blocks
By means of glue
By vulcanization and adhesion of the various interfaces during the manufacturing of the tire or later during the incorporation of the tire wear indicators.

In a version improving the resistance in the mechanical wrenching efforts which mainly occurs in the longitudinal direction, the base of the anchoring system will be longer than wide (better resistance to the longitudinal efforts).

Setting Up

Figure 2:
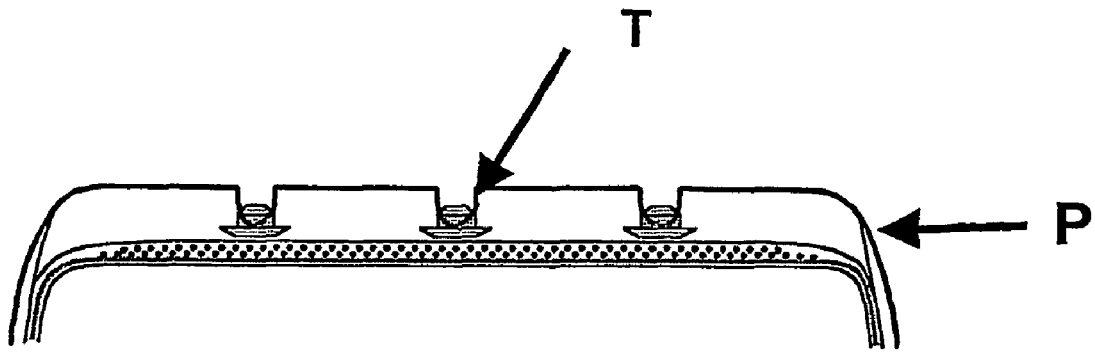
Figure 2:
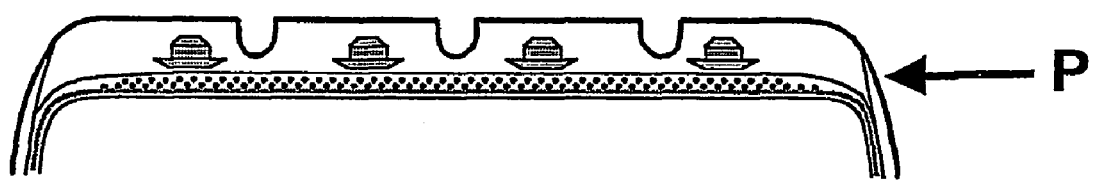

Setting Up of the Tire Wear Indicators in the Tire (cf. FIG. 2)

The device according to the invention is characterized in the fact that the setting up of the tire wear indicators T is made transversely and rather in several locations of the tire tread P (or in a general way of the surface or the considered wear zone).

In a preferential version, we shall select a transverse setting up in 3 locations: one centered, one on the inner shoulder, one on the outer shoulder.

This arrangement is valid for all the modes of the invention, for the reasons indicated previously. In particular, the use of a single central sensor would increase the risk of detecting too late a wear on a side, for example in case of an inappropriate toe of the axle.

This setting up can possibly take place at the bottom of channel or groove of "rib" (FIG. 2A), and/or inside a rubber block (FIG. 2B).

The expert will understand that we can set-up the tire wear indicators of any types used according to the invention, either in the thickness of the tread or in the channel, or in both types of location, even if we use only identical tire wear indicators or not and even if we use different combinations of tire wear indicators (for example acoustics in a channel and magnetic in the rubber, and the other different combinations).

We shall distinguish two setting up:

"Transverse" setting up: it is about the number and the distribution of the sensors on a selected azimuth, for example 90°. As indicated above, rather using three sensors per azimuth.

This transverse setting up is repeated "longitudinally >>" on a certain number of azimuths, whose choice is adapted to generate a signal, or groups of signals, characteristic and distinguishable. For example 90, 120, 145, 180, 270° for a first series.

This longitudinal setting up will be used to distinguish the signature of the tire wear indicators from a signature generated for example by stones inlaid in the channels of the tire.

The number of the tire wear indicators arranged longitudinally will be sufficiently important to carry on working despite the loss or the destruction of one or several of them.

As indicated higher, we can foresee several longitudinal series, each being defined:

By a set of azimuths and
By the arrangement, the number, the transverse setting up of the tire wear indicators, eventually according to different setting up according to the series,
The set constituting a combination generating, for every series, a specific and distinguishable signal.

The tire wear indicators can be identical or different in number, setting up and nature, according to the series, although in a purpose to increase the discrimination between the levels of detection, we can select a type of tire wear indicator by level, or still to distinguish the wear of a particular zone of the tire (for example asymmetrical wear supports) we implant in this zone a type of specific tire wear indicator.

However, in a matter of efficiency, the tire wear indicators will be, rather, the same (of the same nature) for all the series.

These sensors will be set-up in an identical way or not, according to the series.

The upper part of the tire wear indicator will arrive, during the setting up, at a height such that they will knock the ground when the legal wear level, or corresponding to the level of detection wished, will be reached.

This height can be adjusted to warn the driver slightly before the limit of wear is reached.

According to the invention, the device uses microphones as favorite mode of realization of acoustic detectors.

Those sensors are set-up rather in the following way.

Setting Up of One or Several Microphones

We can set up either one microphone (or every sensor capable of getting the acoustic signal generated) per wheel or coupled wheel, or one per axle or one for the whole vehicle, mixed solutions being able to be also envisaged.

If we use a microphone (or another sensor) per wheel, the setting up will be made on the body or on the elements of the suspension system (triangles, strut or hub) or of the wheel or the tire.

If we use a microphone (or other sensors) per axle, the setting up will be made on the body or on the constituent elements of the axle or the suspension system of the aforementioned axle.

If we use a microphone (or other sensors) for the whole vehicle, the setting up will be made on the body or on any element being connected with it.

In the case of the setting up on the body:

The microphone will be set-up in or under the body of the vehicle, near the middle and at distance to the four wheels appreciably equivalent.

It will not have to be too close to the exhaust pipe and will be in recessed with regard to the body to be best protected against the noises generated by the exhaust.

Description of the Receiver

The Microphone

The microphone can possibly have a quite narrow frequency band and centered on high acoustic frequencies corresponding to the natural frequency of the inserted tire wear indicator.

Setting Up:

The microphone will be set-up in or under the body of the vehicle, near the middle and at distance to the four wheels appreciably equivalent.

It will not have to be too close to the exhaust pipe and will be in recessed with regard to the body to be best protected against the noises generated by the exhaust.

Optionally, this microphone could have a relatively narrow pass band centered on high acoustic frequencies corresponding to the natural frequency of the wear indicator inserted.

The Electronics

The device, according to the invention, includes a means of electronic data processing and the means of connection to this means of electronic data processing. It can be a dedicated system (a 4 bits, rather 8 bits, 16 bits microcontroller or technically equivalent). It can also be integrated into an existing central unit or use the car radio, the telephone dedicated to the vehicle or quite other current (or future) electronic systems expected to include a microphone (or quite other sensor capable of doing the same function) and including consequently an electronics adapted to the acquisition and possibly to the data processing of acoustic signals.

In the case of a dedicated computer, this one will be rather constituted of a central unit made of two electronic cards:
  analog card which conditions the analog and digital input signals, contains the power unit as well as the conditioning card of the output signals
  digital card, organized around a processor and which makes all the data processing.

According to the invention, the device includes means adapted to the data processing of signal described above, accessible to every expert of the data processing and\or the electronics, notably the embedded electronics for vehicles.

The invention also concerns a manufacturing process of "tires" equipped with at least one device such as described above.

The setting up can be made with the following method:
  During manufacturing: flooded in rubber block if possible (difficulties of molding with some tread pattern, angular positioning tire on mold).
  Later or during manufacturing, setting up in a rib, claws setting on both sides in rubber blocks.

The invention also concerns "vehicles" (in the wide sense indicated above, that is vehicles, mechanical pieces, and so on . . . ) equipped with at least one tire (in the wide sense indicated above, that is tire or tread either zone or wearing surface such as bearing, mechanical piece in rotation or other movement, and so on.) provide with at least a device such as described above (including mutatis mutandis as indicated higher the adapted devices to the various applications).

System Monitoring the use of Snow Chains of Spikes or Equivalent Devices.

A version of application of the invention in the acoustic main mode, proposes a Detector of presence of snow chains and/or spikes or equivalent device allowing to increase the mobility.

Objective

To detect the use of chains, spikes or devices equipping tires or wheels and made to improve the mobility of vehicles on ground covered with snow and/or ice.

To valorize this information with the other embedded systems: (cruise control, safety and driving assistance systems such as the ABS, the antiskid and the path control system, or even piloted shock absorbers)

To have this valuable information as part of projects articulated around the concept of "intelligent road" such as AIDA™. It could be used to automate the messages of obligation or ban to use such type of equipment according to the kind of road, the weather report and the rules.

To advise the driver as for the opportunity to use snow chain, spikes and so on. according to the contextual diagnosis (adhesion, temperature) made by the embedded computer during the rolling.

Domain of application

Any vehicles powered or not, equipped with tires or with tread, of the type described previously without any limitation.

SUMMARY

The presence of snow chains, of spikes or equivalent special devices satisfies imperatives of road holding in difficult conditions, but can also disturb the functioning of safety systems and driving assistance such as the anti-blockings of brakes, antiskid, piloted shock absorbers and path control systems etc. . . .

Besides, their use corresponds to a specific legislation: authorization or ban, limitations of use.

The proposed device detects the presence or the missing of snow chains, of spikes or equivalent device on the vehicle and so allows to optimize the behavior of the safety and driving assistance systems, to advise the driver on the opportunity to fit up chains, to help the driver to respect the particular legislation on this type of equipment.

By simplicity, we shall appoint in what follows, by <<snow chain >> any device such as snow chains, spikes or any equivalent device allowing to increase the mobility in precarious conditions and any existing or future type.

Advantages
  Optimize the behavior of the safety and driving assistance systems by informing them about the presence of chains.

- Advise the driver via the embedded computer as for the opportunity to put or to remove this kind of equipment according to the contextual diagnosis (adhesion, temperature) made while rolling.
- Help the user to respect the particular conditions linked to the use of snow chains and equivalent devices.
- Reduce the damage of roads and chains due to the practice of an excessive speed (>legal speed),
- Supply a supplementary service to the users as part of the projects of intelligent or communicating road.

DESCRIPTION

Principle

Generally chains, or equivalent devices improving mobility, generate a similar acoustic signal (generally higher) to the one used for the tire wear indicator detector, when using an acoustic detection mode.

This acoustic signature is a function of the geometry and the arrangement of chains or of the device used (radial arrangements, with alveolus, with a variable number of ring bows).

The principle of detection is thus based on an effect generally independent from the type of device used. It consists in the generation of an acoustic signal which is a harmonic of the wheel round and which can be detected by means of a device and/or of a method highly similar to that described previously in the main mode of the wear detector: acoustic mode.

In a specific version, chains will be designed to generate a particular vibratory signature (for example harmonic of the wheel round on one or several harmonics chosen between the $1^{st}$ (included) and the $64^{th}$ (included) harmonics). The detection is then made preferentially on the harmonics generated or, according to the selected setting up, as previously done in the wear detector. However, the first aforementioned criterion can generally still work in this last case.

Other characteristics and advantages of the invention will be better understood in the reading of the following description, and by referring to the annexed drawing on which:

The FIG. 1, which consists of FIGS. 1A and 1B, represents a non restrictive example of the shape of the tire wear indicators T one of them being made in one piece (FIG. 1A) and the other one is constituted by an anchoring base B, of a guide g jointed on this base, and a hammer M sliding on the guide and which is going to strike the base to generate an acoustic signal.

The FIG. 2, which consists of the FIGS. 2A and 2B, represents two non restrictive examples of setting up of the tire wear indicators T in the tire (in three positions centered, internal and outside sidewalls, in bottom of channel or "rib", 2A) or (in four places, in the mass of the rubber, 2B).

Figure 3:
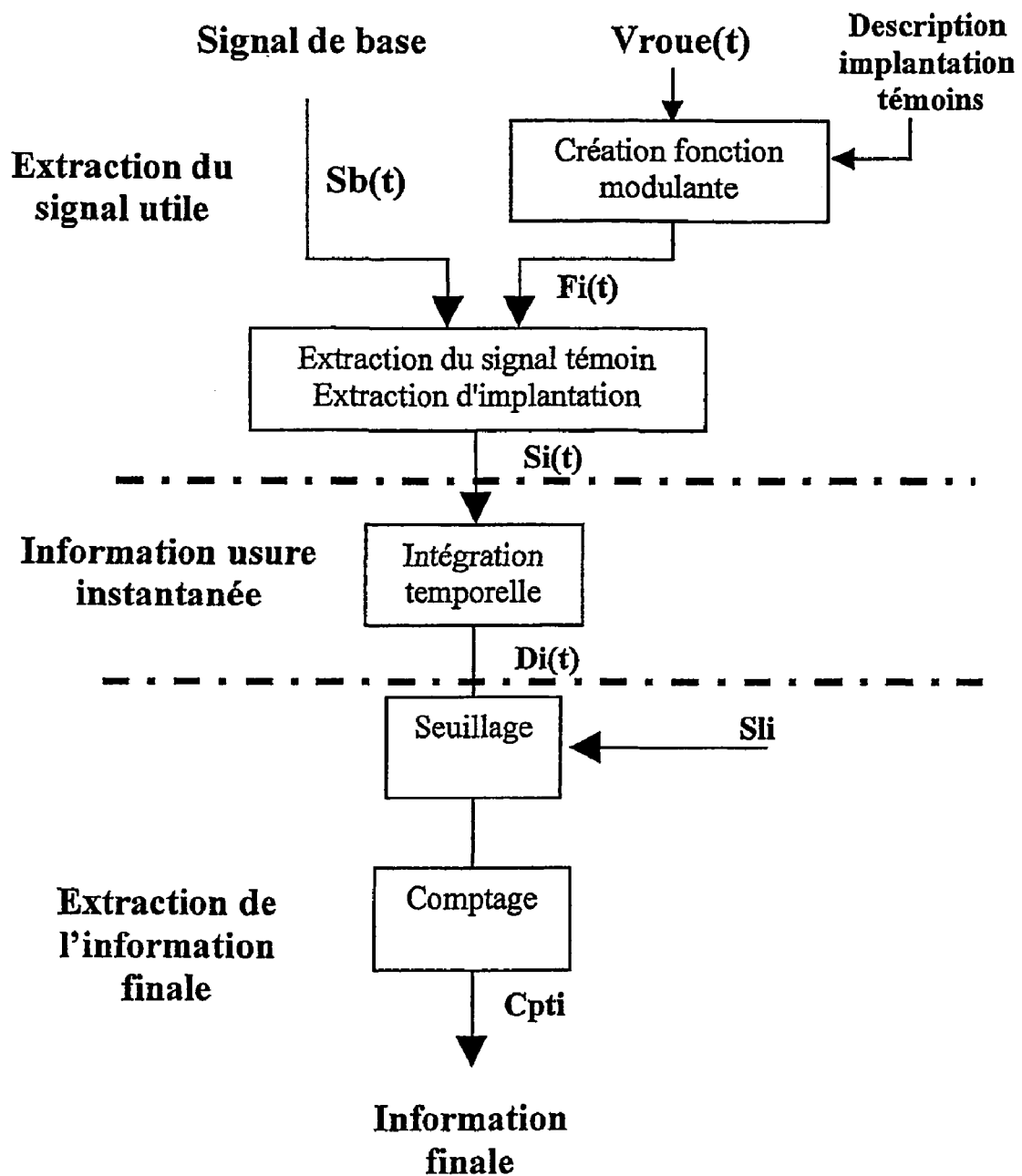

The FIG. 3 represents a synoptic plan of the general data processing of the wear detector (in acoustic mode for a wheel and a level of detection)

Figure 4:
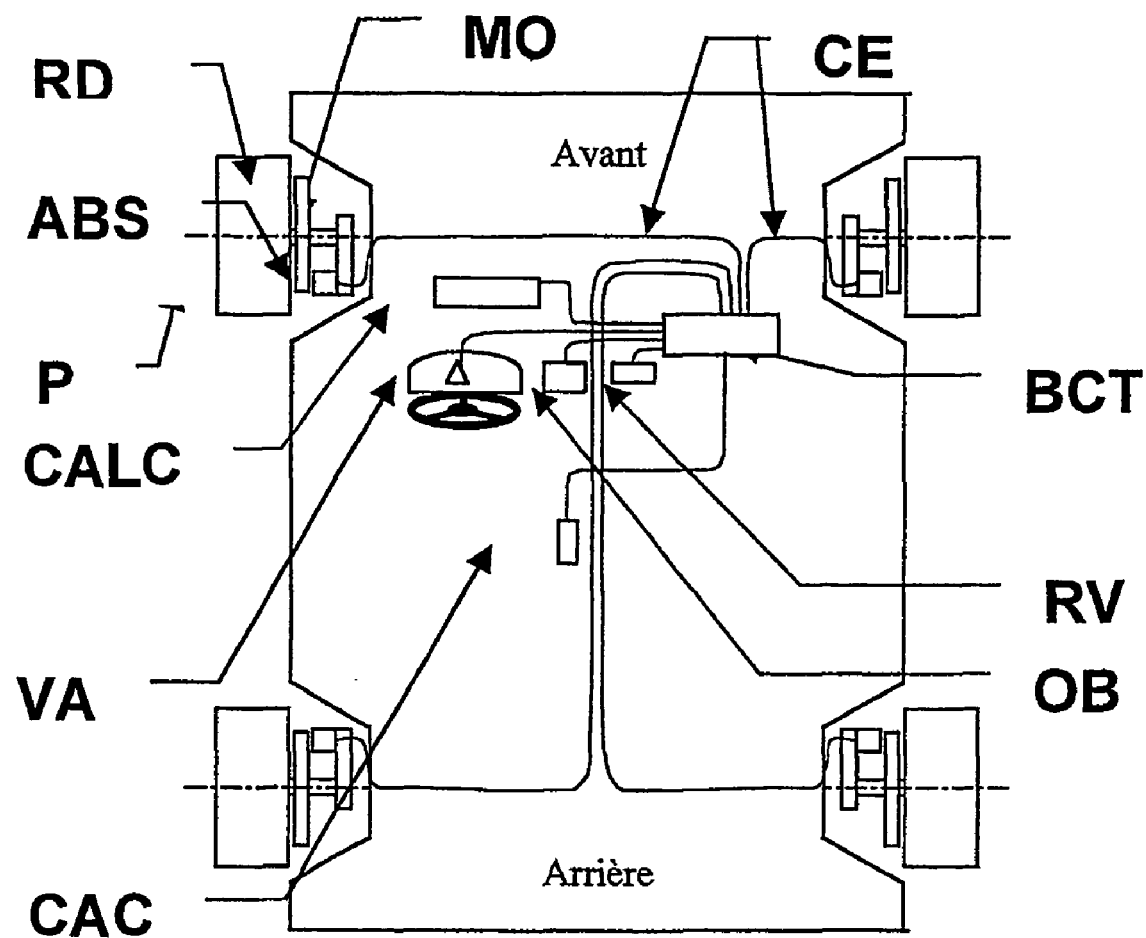
Figure 5:
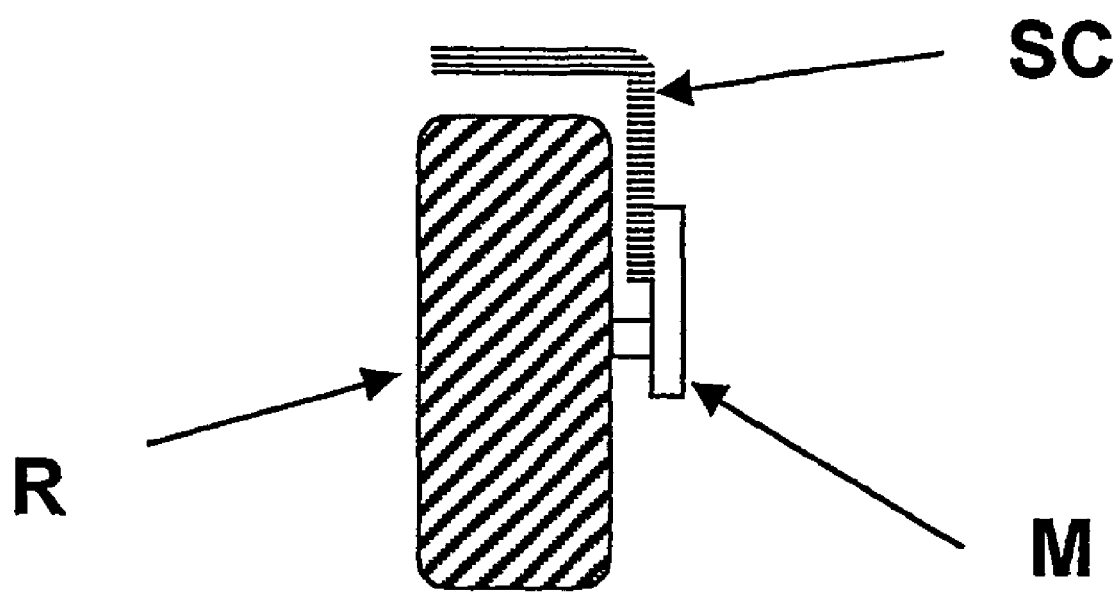
Figure 6:
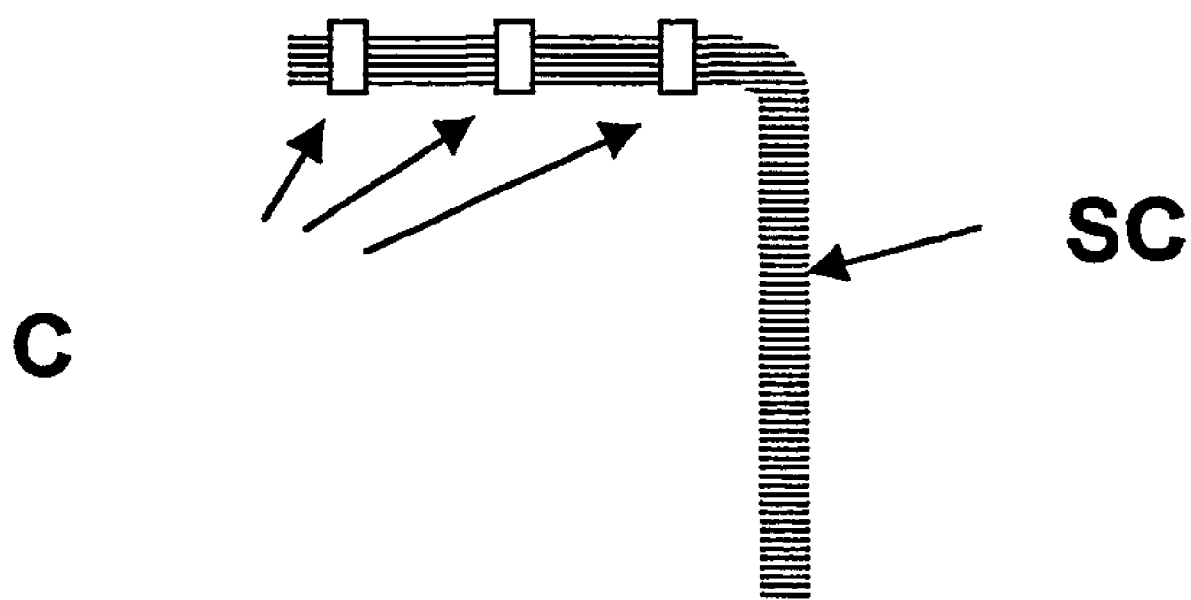

The FIG. 4 represents a non restrictive mode of setting up of a system on a vehicle according to the invention The FIG. 5 represents a non restrictive mode of setting up of the sensors with regard to a wheel of the aforementioned vehicle The FIG. 6 represents a non restrictive example of sensors settings'-up according to the plan of the FIG. 5.

On figures, the same references have the same meanings, which are the following ones:

| | |
|---|---|
| T | tire wear indicator |
| G | guide |
| P | tire |
| ABS ™ ABS | ABS sensor |
| VA | warning light |
| MO | hub |
| CE | electric cablings |
| BCT | packaging and data processing unit of the tire wear detector, according to the invention |
| RV | cruise control |
| O B | embedded computer |
| SC | sensors' support |
| B | anchoring base |
| M | hammer |
| RD | toothed wheel |
| CALC | calculators such as path control Antiskid system |
| CAC | Central acoustic sensor |
| C | Sensors |

EXAMPLES

Example of realization

Vehicle of development: Rover™ 75

Metallic tread wear indicators are inserted into the tread of every tire; this setting up includes a single kind of wear indicator (in stainless steel). The indicator distribution includes two sets of 12 tread wear indicators distributed for the first setting up (depth of tread pattern: 2 mm) on tire azimuths 0°, 90°, 180°, 270° with three wear indicators on each azimuth (inner shoulder, middle of the tread, outer shoulder) and for the second setting up (corresponding to the legal wear limit: 1,6 mm) on tire azimuths 0°, 45°, 180°, 225° with three wear indicators on each azimuth (inner shoulder, middle of the tread, outer shoulder);

The basic signal is delivered by a microphone approximately located in the middle of the body, recessed with regard to body in order to be protected from the projections and from the noise generated by the exhaust pipe;

We use for the wheel speed measurements the pre-set Siemens Automotive™ sensors used for the Bosch™ ABS™ unit.

The signals delivered by these sensors are then transmitted to a central unit located near the ABS™;

This central unit consists of two electronic parts:
- An analog part that conditions the analog and digital incoming signals, includes the power card as well as the conditioners for the outgoing signals
- A digital part, build up around a 8 bits microcontroller and that makes all the data processing.

The device is in the active mode only in the range from 20 to 60 kph, outside this domain, the data are considered as non-existent and the counters values and the Si signals do not evolve;

In the Domain of Activation:

The signals delivered by the wheel speed sensors are conditioned at first by the analog card to be digitized and used by the digital card.

From the description of the setting up of the tread wear indicators for both selected levels of wear and the wheel speed signals supplied by the ABS™ sensors, the digital card calculates the Fi(t) signals for both selected levels of wear (2 mm and 1.6 mm) and for each of the wheels, that is to say 8 signals.

The analog card filters the basic signal Sb with a band pass filter centered around the tread wear indicator frequency: 3500 Hz (as the tread wear indicators used are identical for both levels of wear).

By means of an algorithm notably using the Hadamard transform (that avoid data recording and too complex operations for a 8 bits microchip such as multiplication or addition) applied to the basic signal in phase quadrature (data processing applied only to the modulus and elimination of the phase), it extracts the useful signal.

It integrates then (memory) the eight signals Si(t) on a duration of 2 s and extracts by means of eight evolving thresholds Sli (linked to the speed and fixed by self-learning) the values of the counters (Cpti).

The final information is shown on the dashboard using a pictogram which remains off in the absence of detection, which flickers when a detection of the first level (2 mm) occurs, which becomes permanently red for the second detection level (1,6 mm).

Counters are adjusted to evolve from 0 to 255.

If one of the counters is superior to 200, the alarm (visual and acoustic alarm) corresponding to the wear level and to the wheel is activated, it switches off only when the counter is below 170. The distance between the value of ignition and the value of extinction eliminates unpleasant flickering of luminescent diode during the change of state.

This information is also supplied to a cruise control which was modified to modulate its speed according to the wear level when raining (rain is monitored by an additional sensor used for wipers automatic activation).

Various Modes of Realization:

Main Mode

In this mode, the generation of the signal of wear is made by acoustic tire wear indicators as describes previously whose function is to generate a sound during their impact with the ground.

The transmission is made through the air (and probably through solid element).

The detection is made by means of one or several microphones (or possibly accelerometers whose sensibility is acceptable in the range of generated frequency of the tire wear indicators).

We can also use three secondary modes described in detail higher.
   mechanical Mode
   electromagnetic Mode
   optical Mode According to the current technologies and options of the car manufacturers, the "acoustic" mode seems to be the favorite mode.

It is however very likely that, rather quickly, at least for the said "up-market" vehicles, the "magnetic" or "electromagnetic" modes would be preferred.

Examples of sensors' assembly:

In a very interesting mode, the sensors of acoustic, electric or magnetic measurements can be fitted on a support which allows to place them in front of the tread.

In a favorite version, this support SC is fixed to the hub M of wheel R or on an element of the suspension system. Thus, it moves with the movements of the wheel and in particular can turn with driving wheels during steering as represented on the drawing (FIG. 5).

Example of support SC to three sensors C pointing respectively the outer shoulder, the middle and the inner shoulder of the tread of the tire, as represented on the drawing (FIG. 6).

GENERAL ADVANTAGES OF THE INVENTION

The cost of assembly and manufacture of the part concerning the tire and the one concerning the vehicle are extremely low.

Its reliability and its robustness are very high.

The transmission of the information from the tire to the body of the vehicle does not require important modification (equipment on a new produced vehicle currently in process or on a replacement market is easy).

The fitting on the <<vehicle>> is very simple.

The insertion of the sound generation elements in the tire is simple and compatible with the manufacturing process.

Elements inserted into the tire do not disrupt neither its functioning nor its integrity.

The driver is automatically warned when his tires are worn out.

In a more successful version, the system indicates to the driver which wheel has reached the limit of wear.

The embedded computer, according to the contextual diagnosis made during rolling (adhesion, presence of rain), advise the driver on the appropriate speed reduction.

The safety systems are informed about the wear of each of the tires and integrate this information into their strategy.

The diagnosis of maintenance made by the embedded computer enlist the information wear of each of the tires.

The cruise control, according to the state of wear of tires and presence of rain (information supplied for example by the sensors used to activate windscreen wipers) adapt the speed of the vehicle to avoid any aquaplaning or risk of loss of adhesion.

The driver is automatically warned when his tires are worn out.

In a more successful version, the system indicates to the driver which wheel has reached the limit of wear.

The embedded computer, according to the contextual diagnosis made during rolling (adhesion, presence of rain), advise the driver on the appropriate speed reduction.

The safety systems are informed about the wear of each of the tires and integrate this information into their strategy.

The diagnosis of maintenance made by the embedded computer enlist the information wear of each of the tires.

The invention also covers all the modes of realization and all the applications which will be directly accessible to the expert in the reading of the present demand and to his own knowledge.

The invention claimed is:

1. A method for monitoring the wear of a tire on a vehicle comprising steps of:
providing at least one tread wear indicator on or in said tire, said at least one tread wear indicator adapted to generate a turn of the wheel harmonic signal when said tread wear indicator become exposed due to wear in the tire or when said tread wear indicator becomes worn and disappears;
detecting said turn of the wheel harmonic signal;
extracting a turn of the wheel harmonic component of said signal; and
identifying tread wear of the tire based on the extracted turn of the wheel harmonic component.

2. The method as claimed in claim 1, wherein said at least one tread wear indicator comprises fine or coarse particles.

3. The method as claimed in claim 1, wherein said at least one tread wear indicator comprises a plurality of inserts having various dimensions and geometries.

4. The method as claimed in claim 1, wherein said at least one tread wear indicator comprises tread designs or shapes integrated into or on the tire.

5. The method as claimed in claim 1, wherein:
(a) the at least one tread wear indicator is positioned such that it becomes worn and completely disappears when a level of tread wear is attained, and absence of the tread wear indicator is then detected by the absence of a characteristic signature; or
(b) the at least one tread wear indicator is implanted into the tire at a depth in such a way as to appear when a predetermined level of wear is attained, and the appearance of the tread wear indicator is then detected by the appearance of a characteristic signature.

6. The method as recited in claim 1, wherein said signal comprising at least one of an acoustic, mechanical, optical, and electromagnetic signal.

7. The method as recited in claim 1, wherein said at least one tread wear indicator is adapted to generate an acoustic signal when said tread wear indicator passes through a contact area and not when a tread pattern is worn beyond a predetermined threshold.

8. The method as recited in claim 7, wherein said acoustic signal is generated based upon a function of the number of tread wear indicators coming into contact with a surface, the position of said tread wear indicators, the speed of the vehicle, and acoustic characteristics of the tread wear indicators; and wherein the signal comprises a base frequency corresponding to an acoustic frequency signal fa natural to each tread wear indicator inserted in the tire.

9. The method as recited in claim 8, wherein the signal fa includes a signal ft being a harmonic function of wheel revolution of the tire and also being predetermined to be specific and differentiable.

10. The method as recited in claim 9, further including a step of signal processing for extraction of a signal S(t), S(t) being at least one of signals ft and fa.

11. The method as recited in claim 10, wherein extraction of the signal S(t) is only made when the vehicle is traveling at a speed in a range of 20 to 60 kph and after one minute of monitoring.

12. The method as recited in claim 9, wherein the signal ft is detected from one or more signals supplied by wheel speed sensors of an ABS system of the vehicle, said one or more signals are then modified as a function of different implantations of the tread wear indicators, each different implantation corresponding to a level of wear.

13. The method as recited in claim 9, wherein a Hadamard transformation gate is used to calculate a correlation between the signal fa and the signal ft.

14. The method as recited in claim 13, wherein the Hadamard transformation gate is applied to the signal fa in phase quadrature.

15. The method as recited in claim 1, wherein said at least one tread wear indicator is inserted into a channel, groove or rib of the tread of the tire.

16. The method as recited in claim 15, wherein when the tire is worn down to the at least one tread wear indicator, the at least one tread wear indicator will repeatedly strike a surface which the tire is contacting during revolution of the tire and therefore generate an acoustic signal.

17. The method as recited in claim 1, wherein said providing step includes arranging a plurality of tread wear indicators in a transverse position in relation to a tread of the tire, with at least one indicator being provided per wheel azimuth of the tire, wherein a series of tread wear indicators correspond to wheel azimuths of the tire which differ at least in part.

18. The method as recited in claim 1, wherein said at least one tread wear indicator comprises a material having different optical characteristics than said tire and said signal is an optical signal.

19. The method as recited in claim 18, further comprising a step of providing an optical sensor for detecting the optical signal generated from the at least one tread wear indicators while the vehicle is operated.

20. The method as recited in claim 1, wherein said providing step includes arranging a plurality of tread wear indicators in a transverse position in relation to a tread of the tire, with at least one indicator being provided per wheel azimuth of the tire, wherein a series of tread wear indicators correspond to wheel azimuths of the tire which differ at least in part, and wherein said harmonic component of said signal depends upon the arrangement of said plurality of tread wear indicators.

21. A system for monitoring the wear of a tire on a vehicle, said tire including at least one tread wear indicators on or in said tire, said tread wear indicator adapted to generate a turn of the wheel harmonic signal when said tread wear indicator becomes exposed due to wear in the tire or when said tread wear indicator becomes worn and disappears, said system comprising:
one or more sensors for detecting the turn of the wheel harmonic signal generated by said at least one tread where indicators;
means for extracting a turn of the wheel harmonic component of said turn of the wheel harmonic signal; and
means for identifying tread wear of the tire based on the extracted turn of the wheel harmonic component.

22. The system as claimed in claim 21, wherein said at least one tread wear indicator comprises fine or coarse particles.

23. The system as claimed in claim 21, wherein said at least one tread wear indicator comprises a plurality of inserts having various dimensions and geometries.

24. The system as claimed in claim 21, wherein said at least one tread wear indicator comprises tread designs or shapes integrated into or on the tire.

25. The system as claimed in claim 21, wherein:
(a) the at least one tread wear indicator is positioned such that it becomes worn and completely disappears when a level of tread wear is attained, and absence of the tread wear indicator is then detected by the absence of a characteristic signature; or
(b) the at least one tread wear indicator is implanted into the tire at a depth in such a way as to appear when a predetermined level of wear is attained, and the appearance of the tread wear indicator is then detected by the appearance of a characteristic signature.

26. The system as claimed in claim 21, wherein said signal comprising at least one of an acoustic, mechanical, optical, and electromagnetic signal.

27. The system as claimed in claim 21, wherein said at least one tread wear indicator is adapted to generate an acoustic signal when said tread wear indicator passes through a contact area and not when a tread pattern is worn beyond a predetermined threshold, and said sensor is an acoustical sensor.

28. The system as claimed in claim 27, wherein said acoustic signal is generated based upon a function of the number of tread wear indicators coming into contact with a surface, the position of said tread wear indicators, the speed of the vehicle, and acoustic characteristics of the tread wear indicators; and wherein the signal comprises a base frequency corresponding to an acoustic frequency signal fa natural to each tread wear indicator inserted in the tire.

29. The system as claimed in claim 28, wherein the signal fa includes a signal ft being a harmonic function of wheel revolution of the tire and also being predetermined to be specific and differentiable.

30. The system as claimed in claim 28, further including means for processing for extraction of a signal S(t), S(t) being at least one of signals ft and fa.

31. The system as claimed in claim 30, wherein a Hadamard transformation gate is used to calculate a correlation between the signal fa and the signal ft.

32. The system as claimed in claim 31, wherein the Hadamard transformation gate is applied to the signal fa in phase quadrature.

33. The system as claimed in claim 30, wherein extraction of the signal S(t) is only made when the vehicle is traveling at a speed in a range of 20 to 60 kph and after one minute of monitoring.

34. The system as claimed in claim 28, wherein said sensor detects the signal ft from one or more signals supplied by wheel speed sensors of an ABS system of the vehicle, said one or more signals are then modified as a function of different implantations of the tread wear indicators, each different implantation corresponding to a level of wear.

35. The system as claimed in claim 21, wherein said at least one tread wear indicator is inserted into a channel, groove or rib of the tread of the tire.

36. The system as claimed in claim 35, wherein when the tire is worn down to the at least one tread wear indicator, the at least one tread wear indicator will repeatedly strike a surface which the tire is contacting during revolution of the tire and therefore generate an acoustic signal.

37. The system as claimed in claim 21, wherein a plurality of tread wear indicators are arranged in a transverse position in relation to a tread of the tire, with at least one indicator being provided per wheel azimuth of the tire, wherein a series of tread wear indicators correspond to wheel azimuths of the tire which differ at least in part.

38. The system as claimed in claim 21, wherein said at least one tread wear indicator comprises a material having different optical characteristics than said tire and said signal is an optical signal.

39. The system as claimed in claim 38, wherein said sensor comprises an optical sensor, and wherein said system further comprises:
 means for extracting a harmonic component of said optical signal; and
 means for identifying tread wear of the tire based on the extracted harmonic component.

40. The system as claimed in claim 21, wherein a plurality of tread wear indicators are arranged in a transverse position in relation to a tread of the tire to be monitored, with at least one indicator being provided per wheel azimuth of the tire, wherein a series of tread wear indicators correspond to wheel azimuths of the tire which differ at least in part, and wherein said harmonic component of said signal depends upon the arrangement of said plurality of tread wear indicators.

41. A method of manufacturing a tire comprising steps of:
 providing at least one tread wear indicator on or in said tire, said at least one tread wear indicator adapted to generate a signal when said tread wear indicator become exposed due to wear in the tire or when said tread wear indicator becomes worn and disappears, said signal having an harmonic component that indicates tread wear of the tire.

42. The method as recited in claim 41, wherein said at least one tread wear indicator comprises fine or coarse particles.

43. The method as claimed in claim 41, wherein said at least one tread wear indicator comprises a plurality of inserts having various dimensions and geometries.

44. The method as claimed in claim 41, wherein said at least one tread wear indicator comprises tread designs or shapes integrated into or on the tire.

45. The method as claimed in claim 41, wherein:
 (a) the at lest one tread wear indicator is positioned such that it becomes worn and completely disappears when a level of tread wear is attained, and absence of the tread wear indicator is then detected by the absence of a characteristic signature; or
 (b) the at least one tread wear indicator is implanted into the tire at a depth in such a way as to appear when a predetermined level of wear is attained, and the appearance of the tread wear indicator is then detected by the appearance of a characteristic signature.

46. The method as recited in claim 41, wherein said signal comprises at least one of an acoustic, mechanical, optical, and electromagnetic signal.

47. The method as recited in claim 41, wherein said tread wear indicator is adapted to generate an acoustic signal when said tread wear indicator passes through a contact area and not when a tread pattern is worn beyond a predetermined threshold.

48. The method as recited in claim 41, wherein said tread wear indicator is inserted into a channel, groove or rib of the tread of the tire.

49. The method as recited in claim 48, wherein when the tire is worn down to the tread wear indicator, the tread wear indicator will repeatedly strike a surface which the tire is contacting during revolution of the tire and therefore generate an acoustic signal.

50. The method as recited in claim 41, wherein said at least one tread wear indicator comprises a material having different optical characteristics than said tire and said signal is an optical signal.

51. The method as recited in claim 41, wherein said providing step includes arranging a plurality of tread wear indicators in a transverse position in relation to a tread of the tire, with at least one indicator being provided per wheel azimuth of the tire, wherein a series of tread wear indicators correspond to wheel azimuths of the tire which differ at least in part.

* * * * *